United States Patent [19]

Beyer et al.

[11] Patent Number: 4,964,605
[45] Date of Patent: Oct. 23, 1990

[54] EXTENSIBLE BOTTLE DRAINING SHELF

[76] Inventors: Herbert O. Beyer; Diana Beyer, both of H 14163 Highway J, Wausaw, Wis., 54401

[21] Appl. No.: 407,872

[22] Filed: Sep. 15, 1989

[51] Int. Cl.⁵ .............................................. A47K 1/08
[52] U.S. Cl. ................................. 248/311.3; 248/313; 312/348
[58] Field of Search ................. 248/311.2, 311.3, 312, 248/312.1, 313, 524, 314, 315; 312/348

[56] References Cited

U.S. PATENT DOCUMENTS

| 1,213,645 | 1/1917 | Holden | 248/111 |
| 1,377,160 | 5/1921 | Tiikkainen | 248/313 X |
| 1,408,184 | 2/1922 | Farlow | 248/313 X |
| 1,704,964 | 3/1929 | Dilg | 312/348 X |
| 3,168,272 | 2/1965 | Swinyar | 248/139 |
| 3,387,810 | 6/1968 | Sakier | 248/313 X |
| 4,184,725 | 1/1980 | Spangler | 312/233 |

FOREIGN PATENT DOCUMENTS 100569 1/1899 Fed. Rep. of Germany ...... 248/524
856655 12/1960 United Kingdom ............. 248/311.2

Primary Examiner—David L. Talbott

[57] ABSTRACT

A pair of kitchen cabinet mounted superposed spaced plate members having vertically aligned openings therein and having limited outwardly extended movement, a plate disposed between the spaced plates having an opening therein to be aligned with the openings of the spaced plates and being forwardly movable relative to the spaced plates under spring tension to align the openings for a bottle neck to be inserted into the aligned openings and held therein by a release of the forwardly moved plate member.

4 Claims, 2 Drawing Sheets

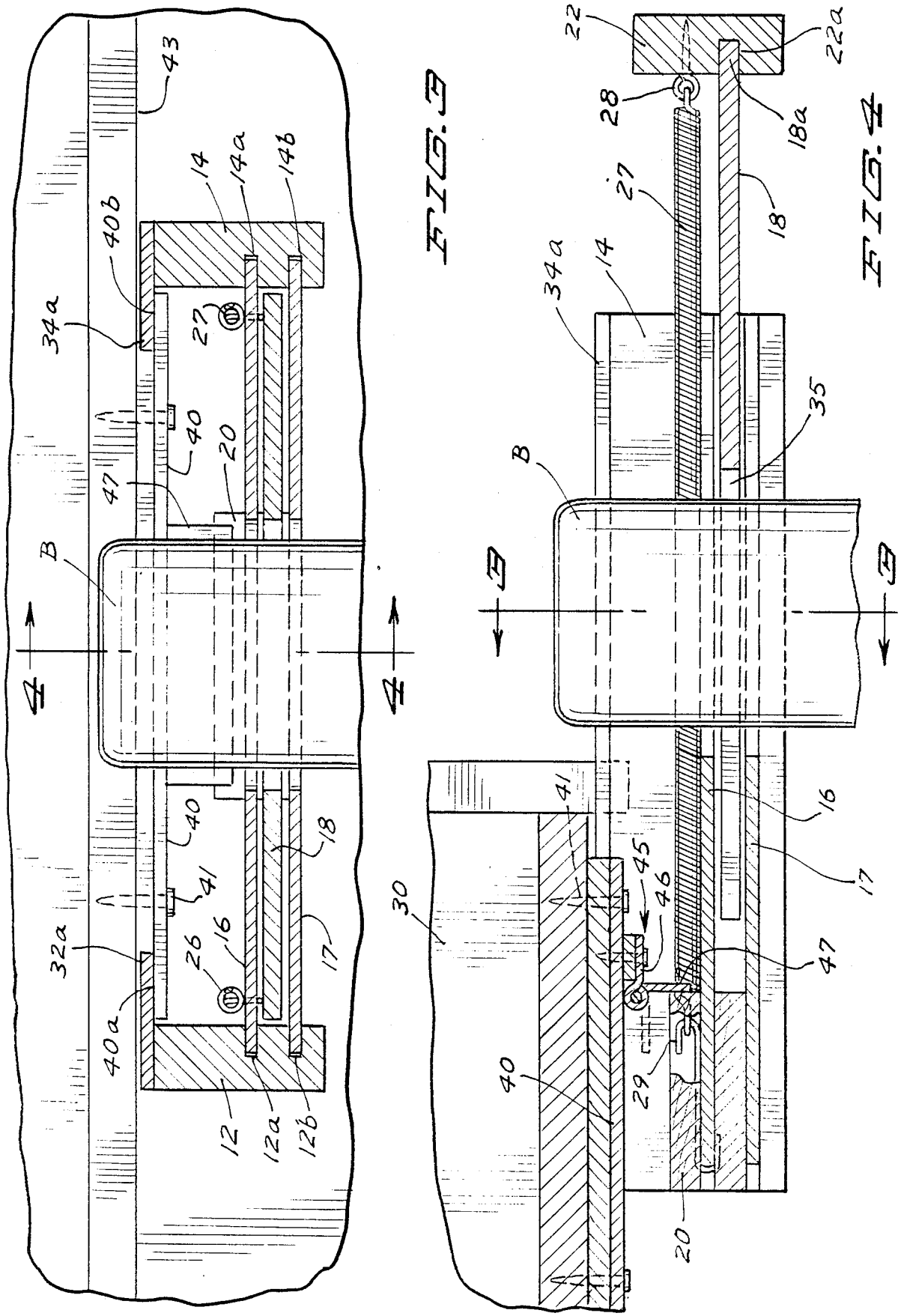

EXTENSIBLE BOTTLE DRAINING SHELF

BACKGROUND OF THE INVENTION

1. Field of the Invention

Relates to an extensible kitchen cabinet bottle draining shelf structure.

2. Brief Description Of The Prior Art

It is desirable to have as a piece of kitchen equipment a device to hold a bottle in a drain position. There is considerable residue in many bottles of liquids which does not run freely due to its viscosity and it is not convenient to personally hold such a bottle for the time required to drain it.

There are known to be self standing bottle holders such as that disclosed in U.S. Pat. No. 3,168,272 to Swinyar. However this makes another item to be stored away on a countertop or in a cabinet and generally such space is very scarce.

SUMMARY OF THE INVENTION

It is a particular object of this invention to provide as a built-in attachment to a kitchen cabinet an extensible holder adapted to hold a bottle in a drain position.

It is another object of this invention to provide an extensible shelf mounted under the upper half of a kitchen cabinet and normally be positioned to be out of the way when not in use.

More specifically it is a object herein to provide in a kitchen cabinet an extensible shelf consisting of a frame slidingly mounted onto a track and securing therein a pair of superposed spaced plate members having a Vee-cut in the forward portions thereof and another plate having a Vee-cut in the rearward portion thereof being slidingly disposed between said superposed plates, said last mentioned plate member being extensibly secured to said superposed plate members for withdrawal movement relative thereto to spread apart s id Vee-cut openings to accommodate a bottle and means limiting the forward movement of said superposed plate members.

These and other objects and advantages of the invention will be set forth in the following description made in connection with the accompanying drawings in which like reference characters refer to similar parts throughout the several views.

BRIEF DESCRIPTION OF THE DRAWINGS

FIG. 3 a view in vertical longitudinal section taken on line 3—3 of FIG. 1 as indicated; and FIG. 4 is a view in vertical transverse section taken on line 4—4 of FIG. 1 as indicated.

DESCRIPTION OF A PREFERRED EMBODIMENT

Figure 1:
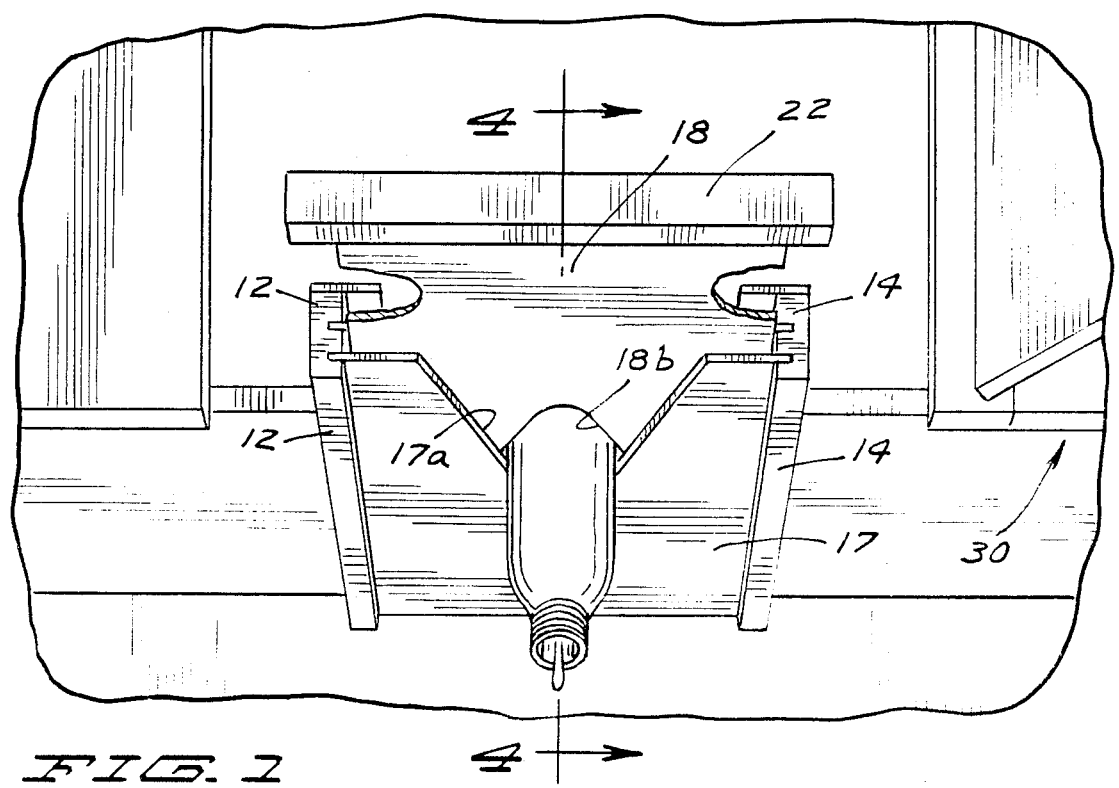
FIG.1 is a bottom plan view of the invention in operating position.

Referring to the drawings, the shelf structure comprising the invention herein is indicated generally by the reference numeral 10.

Said shelf structure in the present embodiment consists of a pair of side members 12 and 14 each having a pair of aligned inwardly facing longitudinally extending slots therein indicated as 12a, and 14a. Said frame members may be made of various materials but are preferably formed of a suitable wood.

Disposed into said slots and holding said frame members in spaced relation are plate members 16 and 17. Said plate members may be secured by an adhesive.

An open ended Vee-cut out as at 16a and 17a is made in the forward portion of each of said plates forming a pair of vertically aligned jaws. The cut out is best seen at 16a.

Secured to the top of the inner end of the plate 16 is an abutment 20 which is merely a block to act as a stop member as will be further described.

Disposed between said plate members 16 and 17 is plate member 18 having its front edge portion 18a secured in slot 22a extending across a front edge frame member 22 which extends across the width of said shelf structure and normally engages the leading end portions 12c and 14c of said side frame members.

Said plate member 18 has a Vee-cut out portion of its rearward portion as at 18b, the same being the reverse of said cut-outs 16a and 17a, the cut-outs being reversely vertically aligned jaw portions which open up as an expanding jaw 35 when said center plate member 18 is withdrawn or pulled out from between said plate members 16 and 17.

Said plate member 18 is held in position subject to withdrawal by what are here shown to be a pair of coil springs 26 and 27, the same being suitably secured at one end to said front edge as by staples 28. Said springs are secured at their inner ends by elongated wire hooks 29 which merely hook over the outer end of the upper plate member 16.

Secured to the top of the frame members 12 and 14 are inwardly extending plate members 32 and 33 secured by screws 34.

A jaw opening 35 is formed by the withdrawal of the plate 18 from between the plates 16 and 17. In order to have this opening extend forwardly of the cabinet 30 to have some free space above, the frame members 12 and 14 and the plates therebetween must have some forwardly extended movement.

A mounting plate bracket 40 having inwardly stepped portions 40a and 40b at each side thereof is mounted onto the bottom 43 of said cabinet 30 disposed between said plate members 32 and 34 whereby the extended portions 32a and 34a of said plate members are slidably rested on said inwardly stepped portions 40a and 40b to form a shelf slide. Said plate bracket 40 is shown secured as by screws 41.

An angled hinge bracket 45 is secured by its horizontal plate 46 to said bottom surface 43 of the upper cabinet and has a depending hinge plate 47 which is engaged by said abutment 20. Said hinge plate 46 bars any forward movement but will swing rearwardly and upwardly whereby it can be raised as by with the insertion such as of a yard stick, if it is desired to remove the shelf completely.

Thus by pulling on the leading edge frame portion 22, the entire jaw area 35 is moved forwardly from out under the cabinet 30 and opened up to receive a bottle B therein in an inverted or drain position, the leading edge 22 is released and is retracted by said springs 26 and 27 to close the opening 35 about the bottle placed therein and said bottle is thus held by frictional engagement in said jaw opening between said plate members.

Figure 2:
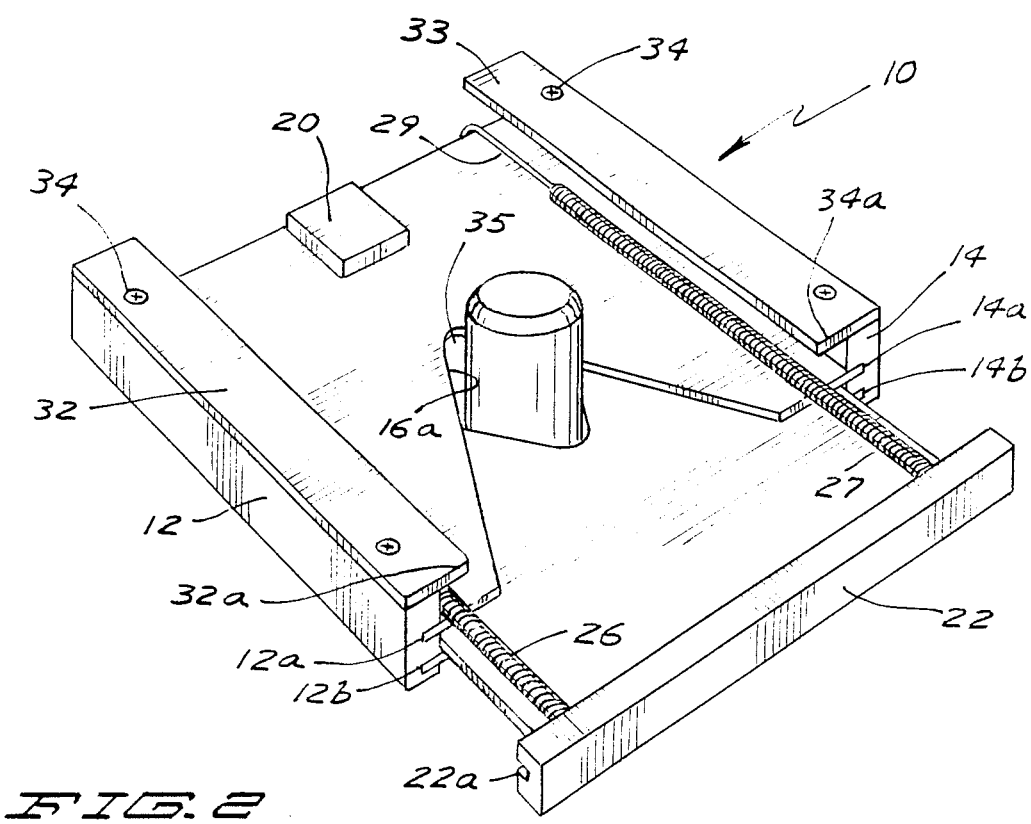
FIG. 2 is a top plan view thereof in perspective.

FIGS. 1 and 2 show an inverted bottle B in a drain position, the lower half of the bottle extends upwardly in FIG. 2 and the upper half extends downwardly in a drain position in FIG. 1.

It will of course be understood that various changes may be made in form, details, arrangement and proportions of the product without departing from the scope of the invention which, generally stated, consists in a product capable of carrying out the objects above set forth, in the parts and combination of parts disclosed and defined in the appended claims.

What is claimed is:

1. An extensible bottle draining shelf, having in combination
    a pair of superposed spaced plate members having vertically aligned open ended Vee cuts therein in a forward portion thereof,
    transversely spaced side wall frame members having facing vertically spaced longitudinal slots therein having adjacent edges of said plate members secured therein,
    a plate member slidably disposed between said spaced plate members having an open ended Vee cut in the rearward portion thereof in reverse vertical alignment with said Vee cut portions in said spaced plate members,
    stretchable means connecting said plate member with said pair of superposed plate members,
    bracket means slidably mounting said wall frame members onto the bottom wall of an upper kitchen cabinet,
    a stop member carried by said spaced plate members in connection with said bottom wall of said cabinet limiting the forward movement of said superposed plate members, whereby
    said plate member is extensible forwardly relative to said superposed plate members to open the vertical space between said aligned Vee cut portions to have a bottle disposed and gripped therein.

2. An extensible bottle draining shelf, having in combination
    a pair of laterally spaced side frame members,
    a pair of superposed spaced plate members secured between said frame members,
    said plate members having vertically aligned forward facing open ended Vee cut out portions,
    an intermediate plate member slidably disposed between said superposed plate members,
    said intermediate plate member having a rearwardly facing open ended Vee cut portion in reverse vertical alignment with said Vee cut portions of said spaced plate members,
    stretchable means connecting said plate member with said spaced plate members,
    means limiting the forward movement of said superposed plate members,
    means slidably supporting said spaced plate members at the bottom of an upper kitchen cabinet, whereby
    said plate member is extended forwardly relative to said superposed plate members opening the vertical space between said Vee cut out portions to grippingly receive a bottle therein.

3. The structure of claim 2, including
    a front edge frame member having said intermediate plate member secured thereto, and
    said extensible means comprising a coil spring secured at its front end to said front edge frame member and at its rear end to at least one of said spaced plate members.

4. The structure of claim 2, wherein
    said opening formed by the relative extension of said plate members being substantially diamond shaped in plan.

* * * * *